United States Patent
Buer et al.

(10) Patent No.: US 9,690,922 B2
(45) Date of Patent: Jun. 27, 2017

(54) SYSTEM, APPARATUS, AND METHOD FOR ANTI-REPLAY PROTECTION OF DATA STORED IN A NON-VOLATILE MEMORY DEVICE

(71) Applicant: Broadcom Corporation, Irvine, CA (US)

(72) Inventors: Mark Buer, Payson, AZ (US); Weiyang Zhou, San Diego, CA (US); Kunyan Liu, San Diego, CA (US); Jaku Jose, San Diego, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 94 days.

(21) Appl. No.: 14/673,086

(22) Filed: Mar. 30, 2015

(65) Prior Publication Data

US 2016/0026783 A1 Jan. 28, 2016

Related U.S. Application Data

(60) Provisional application No. 62/029,844, filed on Jul. 28, 2014.

(51) Int. Cl.
| | |
|---|---|
| G06F 21/34 | (2013.01) |
| G06F 21/71 | (2013.01) |
| G06F 3/06 | (2006.01) |
| G06F 21/79 | (2013.01) |
| G06F 21/64 | (2013.01) |
| G06F 12/14 | (2006.01) |

(52) U.S. Cl.
CPC ............ *G06F 21/34* (2013.01); *G06F 3/0622* (2013.01); *G06F 3/0625* (2013.01); *G06F 3/0653* (2013.01); *G06F 3/0679* (2013.01); *G06F 21/64* (2013.01); *G06F 21/71* (2013.01); *G06F 21/79* (2013.01); *G06F 12/1433* (2013.01); *G06F 2206/1014* (2013.01)

(58) Field of Classification Search
None
See application file for complete search history.

(56) References Cited

U.S. PATENT DOCUMENTS

| | | | | |
|---|---|---|---|---|
| 2002/0038429 | A1* | 3/2002 | Smeets | G06F 12/1408 713/193 |
| 2006/0271796 | A1* | 11/2006 | Kaimal | G06F 21/64 713/194 |
| 2008/0320263 | A1* | 12/2008 | Nemiroff | G06F 21/6209 711/164 |
| 2010/0313056 | A1* | 12/2010 | Margolis | G06F 1/263 713/500 |
| 2011/0145598 | A1* | 6/2011 | Smith | G06F 21/554 713/190 |
| 2011/0154059 | A1* | 6/2011 | Durham | G06F 21/72 713/190 |

* cited by examiner

*Primary Examiner* — Gary W Cygiel
(74) *Attorney, Agent, or Firm* — Sterne, Kessler, Goldstein & Fox P.L.L.C.

(57) ABSTRACT

Embodiments of the present disclosure generally relate to a system, apparatus, and method for providing anti-replay protection of data stored in a non-volatile memory device. Some embodiments describe an anti-replay protection (ARP) device that may protect an external non-volatile memory device from replay attacks.

22 Claims, 5 Drawing Sheets

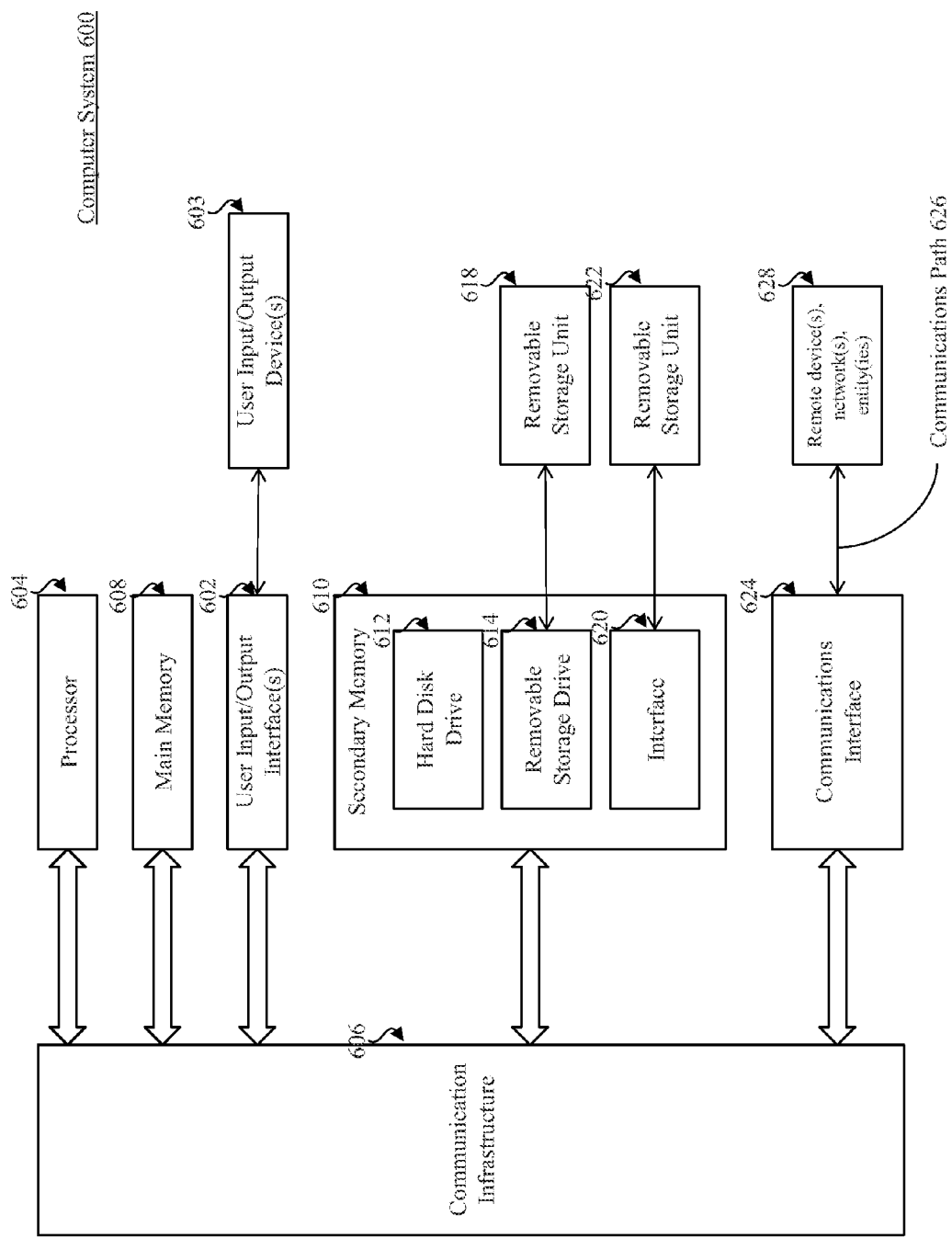

SYSTEM, APPARATUS, AND METHOD FOR ANTI-REPLAY PROTECTION OF DATA STORED IN A NON-VOLATILE MEMORY DEVICE

BACKGROUND

Field

Embodiments of the present disclosure generally relate to a system, apparatus, and method for providing anti-replay protection of data stored in a non-volatile memory device.

Background

Conventional non-volatile memory (NVM), such as flash memory in a smartcard, is susceptible to replay attacks. In a replay attack, the attacker—often having the malicious intent to gain unauthorized access to data or services—makes a copy of the contents of a NVM at a certain point in time. Later, the attacker replays the copied contents to trick a device into accepting the copied contents as legitimate.

The following example illustrates a replay attack. Alice wishes to purchase a product or service from Bob using her smartcard. The NVM memory in Alice's smartcard contains encrypted data that indicates that the original value on Alice's smartcard is $100. The data was encrypted using one or more encryption keys that are agreed upon by Alice and Bob. The transaction, such as purchasing a product or service from Bob for $50, begins when Alice's smartcard transmits the encrypted data indicating the original value on her smartcard to Bob's smartcard reader. The encrypted data exchanged in this first transmission may be digitally signed by Alice. Bob's smartcard reader authenticates the transmission from Alice and decrypts the encrypted data indicating the original value on the smartcard ($100). Bob's smartcard reader then debits the purchase price ($50), generates and encrypts data indicating the updated value to be placed on Alice's smartcard ($50), and transmits the encrypted data indicating the updated value to Alice's smartcard. Again, this transmission may be digitally signed by Bob. Receiving the transmission, Alice's smartcard authenticates that the transmission came from Bob and stores the encrypted data indicating the updated value on Alice's smartcard in the NVM. After the transaction, the value remaining on the Alice's smartcard is $50.

Eavesdropping on the transaction between Alice and Bob, the attacker Mallory intercepts and copies the first transmission from Alice to Bob, which contained the digitally-signed (by Alice) and encrypted data indicating the original value of Alice's smartcard. Then, at a later time, Mallory replays the intercepted transmission to Bob's smartcard reader. Because Bob's smartcard reader is able to authenticate and decrypt the transmission, Bob's smartcard reader is tricked into believing that the transmission came from Alice's smartcard and that the value of her smartcard is still $100. Mallory can replay the intercepted transmission over and over, each time tricking Bob's smartcard reader into believing that the transmission came from Alice and that the value on her smartcard is $100. This example illustrates that an attacker in a replay attack may be able to easily subvert security measures—e.g., encryption and authentication—without breaking the encryption, stealing passwords, etc.

BRIEF DESCRIPTION OF THE DRAWINGS/FIGURES

FIG. 6 illustrates an example computer system that may incorporate one, some, or all of the components of the example system of FIG. 1.

DETAILED DESCRIPTION OF EXAMPLE EMBODIMENTS

Figure 1:
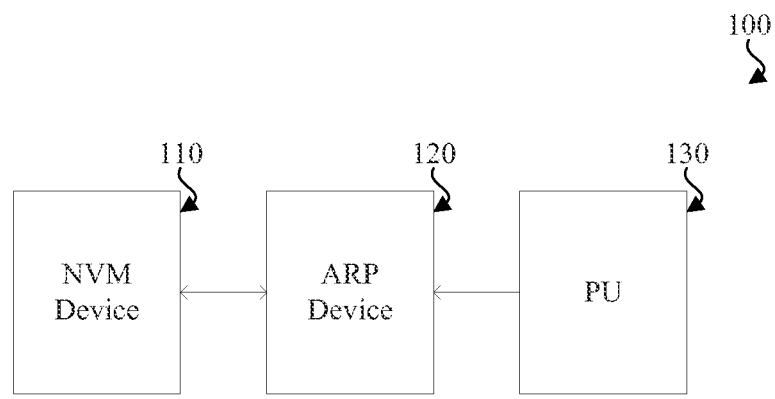
FIG. 1 illustrates an example system for providing anti-replay protection of data stored in a non-volatile memory device.

While the present disclosure is described herein with illustrative embodiments for particular applications, it should be understood that the disclosure is not limited thereto. A person skilled in the art with access to the teachings provided herein will recognize additional modifications, applications, and embodiments within the scope thereof and additional fields in which the disclosure would be of significant utility.

The terms "embodiments" or "example embodiments" do not require that all embodiments include the discussed feature, advantage, or mode of operation. Alternate embodiments may be devised without departing from the scope or spirit of the disclosure, and well-known elements may not be described in detail or may be omitted so as not to obscure the relevant details. In addition, the terminology used herein is for the purpose of describing particular embodiments only and is not intended to be limiting. For example, as used herein, the singular forms "a," "an" and "the" are intended to include the plural forms as well, unless the context clearly indicates otherwise. It will be further understood that the terms "comprises," "comprising," "includes" and "including," when used herein, specify the presence of stated features, integers, steps, operations, elements, and components, but do not preclude the presence or addition of one or more other features, integers, steps, operations, elements, components, or groups thereof.

Embodiments of the present disclosure generally relate to a system, apparatus, and method for providing anti-replay protection of data (content) stored in a non-volatile memory (NVM) device. One embodiment describes an anti-replay protection (ARP) device—which may also be called a "security device" or "security chip"—that protects the content stored in an external NVM device from replay attacks, such as the type of replay attack described in the example above. In this embodiment, the ARP device includes a one-time programmable (OTP) memory device that maintains a replay counter. The ARP device may maintain the value of the replay counter within a security boundary such that it is not discoverable to a malicious party. The replay counter is used along with the content of the NVM device to generate a hash value each time the content of the NVM device is changed or updated. This hash value is stored in a persistent or battery-backed memory device within the ARP device, and is used to validate the content of the NVM device.

To validate the content of the NVM device, the ARP device of this embodiment retrieves the content of the NVM device and the value of the replay counter, and generates a test hash value. The test hash value is then compared to the hash value that is stored in the ARP device. The content of the NVM device may be considered valid when the result of the comparison indicates that the test hash value matches or is the same as the stored hash value. When the result of the comparison indicates that the test hash value does not match the stored hash value, the content of the NVM device may be considered invalid. An attempted replay attack or corruption of the content of the NVM device may cause an invalid result. The NVM device may be reset (restored) to a default or factory setting in response to the ARP device determining that the contents of the NVM device are invalid. The replay counter may also be incremented when the content of the NVM device cannot be validated. Each time that the content of the NVM device is updated (including after the NVM device is restored to a default or factory setting), a hash value is generated (as described above) and stored in the ARP device.

While the hash value that is stored in the ARP device is updated each time that the content of the NVM device is changed, the replay counter of this embodiment is not incremented in response to these changes. Rather, the replay counter of this embodiment is incremented in response to the ARP device losing power from a main power source, such as a battery. By limiting the number of times the replay counter is implemented, the ARP device of this embodiment minimizes the number of bits that are required to be programmed in the OTP memory device. In this embodiment, the replay counter may be referred to as a power-fail-protected replay counter (PRC), and a hash value that is generated using the replay counter as an input (as described above) may be referred to as a PRC value. As indicated above, the replay counter may also be incremented in response to the ARP device being unable to validate the content of the NVM device, which may be caused by the content of the NVM device becoming corrupted.

The ARP device of this embodiment receives power from a power unit that includes the main power source and a backup power source. In response to losing or failing to receive power from the main power source (e.g., the battery becoming depleted), the ARP device may temporarily receive power from the backup power source and write the hash value stored in the ARP device to the external NVM device. The ARP device of this embodiment maintains the hash value within a security boundary unless the power fails in this manner.

Each time that the ARP device of this embodiment boots up, including when power from the main power source is restored (after a power failure), the ARP device performs a boot sequence that attempts to determine the state of the ARP and NVM devices. The boot sequence begins by comparing the hash value that is stored in the ARP device to a test hash value that is generated from the content of the NVM device and the value of the replay counter. If these hash values match, the ARP device and the NVM device are in sync and the content of the NVM device is considered valid. In this scenario, the replay counter is not incremented.

If the test hash value does not match the stored hash value, the ARP device searches for a hash value stored on the NVM device. As mentioned, the ARP device of this embodiment writes the hash value stored in the ARP device to the NVM device in response to a loss of power from the main power source. If a hash value can be retrieved from the NVM device (which may indicate that the ARP device is booting from a power loss scenario), it is compared to the test hash value. A match validates the content of the NVM device, otherwise the content of the NVM device is considered invalid and the NVM device is reset to a default or factory setting. Likewise, if a hash value cannot be retrieved from the NVM device, the content of the NVM device is considered invalid and the NVM device is reset to a default or factor setting. After the content of the NVM device is either validated (using the hash value retrieved from the NVM device) or reset, the replay counter is incremented and the ARP device generates a new hash value using the incremented counter value and the content of the NVM device. The new hash value is stored in the ARP device and the boot sequence ends. This new hash value may be used in subsequent attempts to validate the content of the NVM device.

As should be apparent to a person skilled in the art, the example embodiment just described is merely illustrative and is not intended to be limiting. These and other aspects of the disclosure are described in more detail below.

Turning now to FIG. 1, an example system 100 for providing anti-replay protection of data (content) stored in a non-volatile memory (NVM) device is illustrated. The system 100 includes a NVM device 110, an anti-replay protection (ARP) device 120, and a power unit (PU) 130. A person skilled in the art would understand that the system 100 may include one or more components—e.g., implemented in hardware, software (including firmware) or any combination of hardware and software—in addition to the components shown in the embodiment of FIG. 1 without departing from the scope of this disclosure. Software described throughout this disclosure may be embodied as one or more computer-readable instruction(s) stored on a non-transient computer-readable storage device that can be executed by a processor to perform one or more operation(s). Examples of computer-readable storage devices include, but are not limited to, semiconductor memory devices (e.g., random-access memory (RAM), read-only memory (ROM)), magnetic memory devices, optical memory devices, and the like.

In the system 100 of FIG. 1, the NVM device 110 is coupled to or is capable of coupling to the ARP device 120. The NVM device 110 and the ARP device 120 may be coupled or capable of coupling via a wired or wireless connection. The NVM device 110 may include any type of non-volatile memory. Examples of non-volatile memory include, but are not limited to, flash memory, ferroelectric random access memory (F-RAM), magnetic memory, optical memory, and the like. In some embodiments, the NVM device 110 includes flash memory. In these embodiments, the flash memory may be any type of flash memory, such as NAND-type or NOR-type flash memory. Data stored in the NVM device 110 may or may not be encrypted. A person skilled in the art would understand that the NVM device 110 may include one or more components, circuits, and the like in addition to non-volatile memory without departing from the scope of this disclosure.

The ARP device 120 of FIG. 1 is coupled to or capable of coupling to the NVM device 110. As explained, the NVM device 110 and the ARP device 120 may be coupled or capable of coupling via a wired or wireless connection. Using the techniques described throughout this disclosure, the ARP device 120 protects the data or content stored in a NVM device from replay attacks. Thus, in some embodiments, the ARP device 120 may be referred to as a "security device" or "security chip." In some embodiments, the messages exchanged between the NVM device 110 and the ARP device 120 are transmitted via a secure channel using cryptographic techniques. Encryption and authentication using, e.g., symmetric algorithms, public-key algorithms, one-way functions, etc., are non-limiting examples of the cryptographic techniques that may be used in embodiments described throughout this disclosure. Alternatively, the messages exchanged between the NVM device 110 and the ARP device 120 may be transmitted in the clear in other embodiments. An example anti-reply protection device that may be implemented as the ARP 120 of FIG. 1 is described in further detail in accordance with FIG. 2, below. As should be apparent to a person skilled in the art, the ARP device 120 may be capable of coupling to more than one NVM device and providing the functionality described throughout this disclosure for each of the NVM devices.

The ARP device 120 of FIG. 1 is also coupled to or capable of coupling to the PU 130. The PU 130 provides power to the ARP device 120. The ARP device 120 and the PU 130 may be coupled or capable of coupling via a wired or wireless connection. For example, a hardwire connection may couple the ARP device 120 and the PU 130. In another example, the PU 130 may provide power to the ARP device 120 wirelessly via induction. An example power unit that may be implemented as the PU 130 of FIG. 1 is described in further detail in accordance with FIG. 3, below.

Some or all of the components of the system 100 of FIG. 1 may be implemented as different integrated circuits. Different integrated circuits may be mounted on the same substrate, such as a printed circuit board (PCB). A PCB may include expansion capability, providing interfaces or slots for the attachment of components or peripherals. For example, a PCB may have slots for memory, expansion cards, and the like. Considering FIG. 1, each of the NVM device 110, the ARP device 120, and the PU 130 may be implemented as different integrated circuits that are mounted on or otherwise connectable to a PCB.

Some or all of the components of the system 100 may be implemented as the same integrated circuit. For example, each of the NVM device 110, the ARP device 120, and the PU 130 may be implemented as a single integrated circuit that is fabricated on the same die.

Some or all of the components of the system 100 of FIG. 1 may be included in the same physical device housing. In some embodiments, the NVM device 110, the ARP device 120, and a power unit 130 may all be included within the housing of a computing device. Examples of computing devices include, but are not limited to, a desktop computer, a laptop computer, a tablet computer, a mobile telephone or smartphone, a personal digital assistant (PDA), and any type of wearable computing device (such as a wrist watch or "smart" watch, computerized eyeglasses, an identification badge, etc.). These examples illustrate both mobile and stationary computing devices. FIG. 6, detailed below, illustrates an example of one such computing device.

In other embodiments, the ARP device 120 may be included within the housing of a device, while the NVM device 110 may be included in a separate device having a interface that can be detachably coupled to the mobile computing device. For example, the ARP device 120 and the PU 130 may be included in a first device that includes a smartcard reader and the NVM device 110 may be included in a smart card or credit card. For instance, returning briefly to the example transaction between Alice and Bob that was described above, Alice's smart card may include the NVM device 110 (storing the value of the card), and Bob's smart card reader may include the ARP device 120 and PU 130 to prevent Mallory's replay attack. This example illustrates that NVM device 110 and ARP device 120 may be coupled via a wireless connection, which includes (but is not limited to) as near field communication (NFC), a Bluetooth communication, wireless local area network (WLAN) communication device, a cellular or other radio frequency (RF) communication, an infrared communication, and the like. As another example, the ARP device 120 and the PU 130 may be included in a first device and the NVM device 110 may be included in a second device having a universal serial bus (USB) interface for coupling to the first device. This example illustrates that NVM device 110 and ARP device 120 may be coupled via a wired connection. Any wired connection for coupling some or all of the components of the system 100 known to a person skilled in the art are within the scope of this disclosure. The various embodiments and examples just described are merely illustrative, and are not intended to be limiting.

Figure 2:
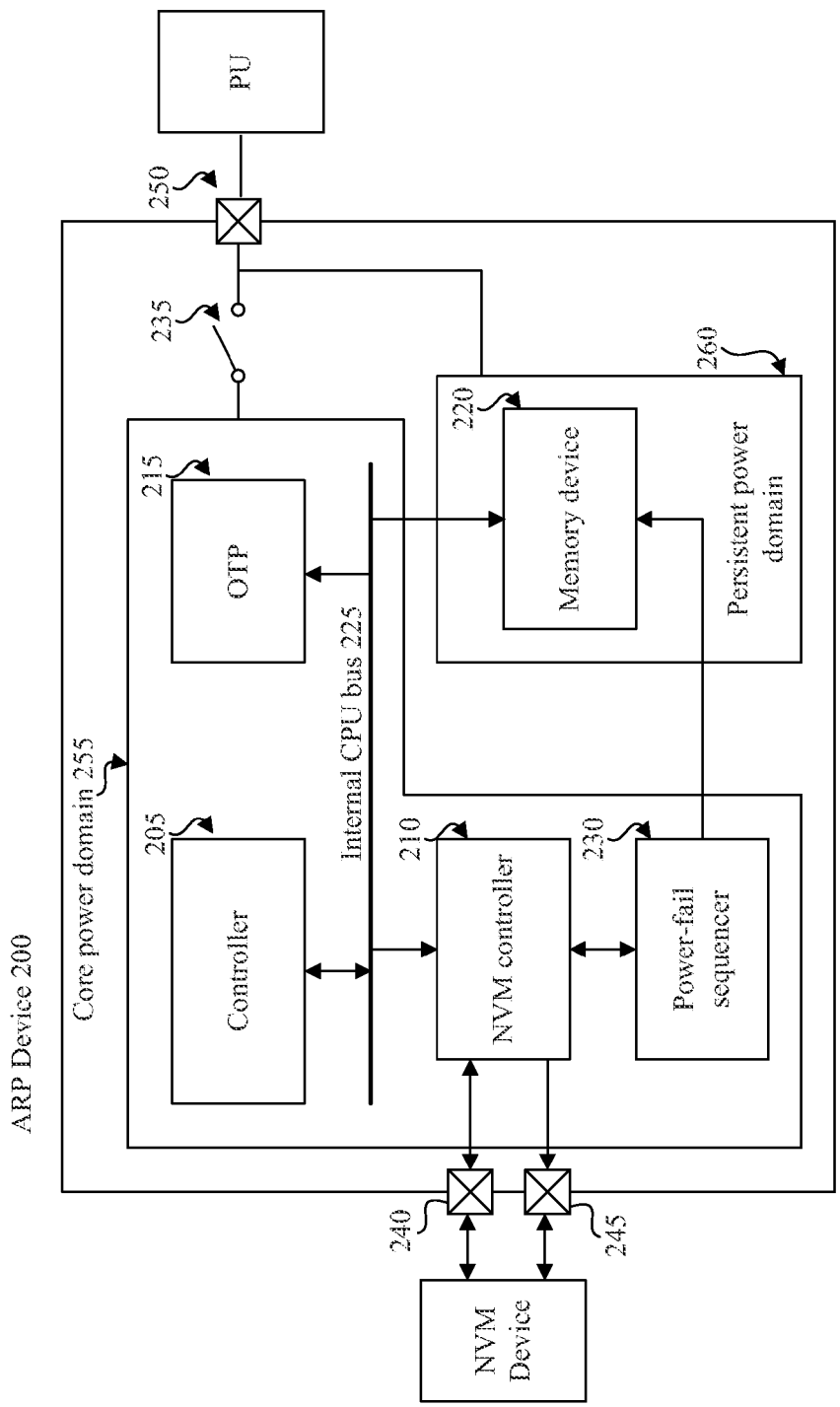
FIG. 2 illustrates an example device for providing anti-replay protection of data stored in a non-volatile memory device.

Turning now to FIG. 2, an example ARP device 200 for protecting data stored in a NVM device from replay attacks is illustrated. The ARP device 120 of FIG. 1 may be implemented as described with respect to the ARP device 200 of FIG. 2. The example ARP device 200 includes a controller 205, a NVM controller 210, a one-time programmable (OTP) memory device 215, a memory device 220, a bus 225, a power-fail sequencer 230, a switch 235, and interfaces 240 and 245 for coupling to and communicating with a NVM device (such as the NVM device 110 of FIG. 1), and an interface 250 for coupling to and receiving power from a power unit (such as the PU 130 of FIG. 3 or the PU 300 of FIG. 3).

As shown in FIG. 2, the controller 205, the NVM controller 210, the OTP memory device 215, and the memory device 220 are coupled to and communicate via the bus 225. The power-fail sequencer 230 of FIG. 2 is coupled to the NVM controller 210 and the memory device 220. The NVM controller 210 is coupled to the interfaces 240 and 245. In the example embodiment of FIG. 2, the controller 205, the NVM controller 210, the OTP memory device 215, the bus 225, and the power-fail sequencer 230 are included in a core power domain 255, which is coupled to the interface 250 via the switch 235. And the memory device 220 is included in a persistent power domain 260 in the example embodiment of FIG. 2.

The switch 235 that is illustrated in the example embodiment of FIG. 2 connects (closed position) and disconnects (open position) the core power domain 255 (and the components in the core power domain 255) to the interface 250 for receiving power from a PU. For example, when the ARP device is idle—e.g., not currently coupled to a NVM device or coupled to a NVM device that is not in current use—the switch 235 may disconnect the core power domain 255 from the PU to conserve power. When the functionality of the ARP device 200 is required (e.g., to validate the content of a NVM device), the switch 235 may close to connect the core power domain 255 to the interface 250 to receive power. In some embodiments, when the switch 235 closes, the ARP device 200 performs a boot or startup sequence, such as the method described in accordance with FIG. 5 below. In the ARP device 200 of FIG. 2, opening the switch 235 does not affect power to the memory device 220; the memory device 220 may continue to receive power from the PU regardless of the position of the switch 235.

Some or all of the components of the ARP device 200 may be included within a security boundary 265. In the example embodiment of FIG. 2, the controller 205, the NVM controller 210, the OTP memory device 215, the memory device 220, the bus 225, the power-fail sequencer 230, and the switch 235 are included within the security boundary 265. The security boundary 265 may be established using hardware techniques, cryptographic techniques, or both hardware and cryptographic techniques. An example hardware technique for providing a security boundary includes placing components within a single integrated circuit. Additionally, one or more integrated circuits may be protected by a physical structure using tamper evident or tamper resistant techniques—including, but are not limited to, epoxy encapsulation. An example encryption technique for establishing a security boundary includes encrypting sensitive information before it is shared outside the security boundary. In some embodiments, the cryptographic keys stored in the OTP memory device 215, the memory device 220, or elsewhere within the ARP device 200 that are used to perform the cryptographic techniques described throughout this disclosure are not shared outside of the security boundary 265. In one example embodiment, the cryptographic keys used to encrypt/decrypt a hash value that is stored in the memory device 220 are never shared outside the security boundary 265.

The controller 205 of FIG. 2 controls the overall operation of the ARP device 200. The controller 205 may include one or more processors. Examples of the controller 205 include, but are not limited to, one or more: central processing units (CPU), field programmable gate arrays (FPGA), application specific integrated circuits (ASIC), digital signal processors (DSP), and the like.

The NVM controller 210 of FIG. 2 controls communication (e.g., reading data from and writing data to) with a NVM device via the interfaces 240 and 245. While the interfaces 240 and 245 are depicted as two separate interfaces in the embodiment of FIG. 2, the functionality associated with the interfaces 240 and 250 (described below) may be achieved with a single interface in other embodiments. The NVM controller 210 may receive instructions from the controller 205 via the bus 225 to communicate with the NVM device. Additionally, the NVM controller 210 may receive instructions from the power-fail sequencer 230 to communicate with the NVM device.

In the embodiment depicted in FIG. 2, the interface 240 facilitates bi-directional communication between the NVM controller 210 and the NVM device. In this embodiment, the NVM controller 210 may read data from and write data to the NVM device using the interface 240. The NVM controller 210 may use the interface 240 to communicate with the NVM device under "normal" operating conditions—that is, when the ARP device 200 (or one or more components of the ARP device 200) is being powered by a main power source of a power unit (via the interface 250).

In the embodiment depicted in FIG. 2, the interface 245 facilitates one-way communication between the NVM controller 210 and the NVM device. In this embodiment, the NVM controller 210 may write data to the NVM device using the interface 245. The NVM controller 210 may use the interface 245 to communicate with the NVM device in response to the ARP device 200 (or one or more components of the ARP device 200) losing or failing to receive power from the main power source of a power unit (via the interface 250).

The OTP memory device 215 of FIG. 2 may include any type of memory that can be programmed or modified one time. For example, the OTP memory device 215 may include programmable read-only memory (PROM). Each bit of the memory in the OTP memory device 215 may be set or programmed using a fuse or an antifuse. The controller 205, communicating via the bus 225, may program the OTP memory device 215. The OTP memory device 215 may store encryption keys that can be used to perform cryptographic techniques (such as those described above). The encryption keys stored in the OTP memory device 215 may be programmed by the manufacturer of the ARP device 200, and may be considered "factory" or "default" encryption keys. As should be apparent to a person skilled in the art, other encryption keys may be programmed into the OTP memory device 215 during use of the ARP device 200.

The OTP memory device 215 may store a replay counter. Techniques described throughout this disclosure may use the replay counter stored in the OTP memory device 215 to protect against or detect the occurrence of a replay attack. The replay counter may be initialized to a default value by the manufacturer of the ARP device 200. In some embodiments, the value of the replay counter is maintained within the security boundary 265, and thus protected from discovery by a malicious party.

In some example embodiments, the replay counter is incremented in response to the occurrence of one or more events. As explained throughout this disclosure, the ARP device 200 may receive power from a main power source that is included in a power unit. In one embodiment, the replay counter is incremented in response to the ARP device 200 losing or failing to receive power from the main power source. The replay counter may be incremented in response to one, some, or all of the components of the ARP device 200 losing or failing to receive power from the main power source. The replay counter may also be incremented when the content of the NVM device coupled to the ARP device 200 cannot be validated, which may indicate an attempted replay attack or that the content of the NVM device has become corrupted.

Still considering FIG. 2, the memory device 220 may include any type of memory. The memory device 220 may include persistent memory. In some embodiments, the memory device 220 includes battery-backed or battery-backup random access memory (BBRAM). In the embodiment depicted in FIG. 2, the memory device 220 stores one or more hash values that are generated by the ARP device 200 using a one-way hash function. A hash value may or may not be encrypted before being stored in the memory device 220. When encrypted before being stored, a hash value is decrypted after it is retrieved from the memory device 220. The OTP memory device 215 may be programmed (e.g., by the manufacturer of the ARP device 200) to store the one or more cryptographic keys that are used to encrypt and decrypt a hash value stored in the memory device 220.

Hash values may be generated using any one-way hash function. In some embodiments, the hash values may be generated using a message authentication code (MAC) algorithm. Examples of message authentication code algorithms include, but are not limited to, MAC, HMAC, CMAC, AES-CMAC. Further, in these embodiments, the OTP memory device 215 may be programmed (e.g., by the manufacturer of the ARP device 200) to store the one or more secret cryptographic keys that are used to generate the MAC, which may be referred to as the MAC key(s).

The controller 205 of FIG. 2 may execute code to generate the hash values that are stored in the memory device 220. The input to the hash function (sometimes called the "preimage") may be a combination of the value of the replay counter (stored in the OTP memory device 215) and the content of the NVM device that is coupled to the ARP device 200 via the interfaces 240 and 245. A hash value may be generated and stored in the memory device 200 each time that the content of the NVM device coupled to the ARP device 200 is updated. On the other hand, the replay counter in the OTP memory device 215 is only updated in response to certain events (such as a loss of power from a main power source) in some embodiments, which minimizes the number of bits required to be used for the replay counter and thus may reduce the size of the OTP memory device 215. But since the hash value is generated using both the value of the replay counter (which may be maintained securely within the security boundary 265) and the contents of the NVM device, a different hash value may be generated each time the contents change, even if the value of the replay counter has not changed. A newly-generated hash value may replace any previously-generated hash values in the memory device 220. Again, the hash value may be used by the ARP device 200 to validate the contents of the NVM device that is coupled to the ARP device 200 and to protect against replay attacks. Alternatively, the reply counter can be updated based on other events that happen infrequently. The event may be chosen, e.g., such that an attacker would not be able to speculate on the value of the reply counter and thus the hash value will be secure.

The ARP device 200 of FIG. 2 also includes a power-fail sequencer 230 that is coupled to the NVM controller 210 and the memory device 220. In response to a loss of power from a main power source (e.g., one, some, or all of the components of the ARP device 200 losing or failing to receive power from a main power source), the power-fail sequencer 230 may retrieve the current (last value before loss of main power) hash value that is stored in the memory device 220, and instruct the NVM controller 210 to write the retrieved hash value to the NVM device via interface 245. Writing the retrieved hash value to the NVM device may be a high priority or the highest priority of the ARP device 200 in response to the loss of power from the main power source. The ARP device 200 may detect the loss of power from the main power source using its components (e.g., the controller 205, the power-fail sequencer 230, etc.), or may receive an indication from the PU that power from the main power source is no longer available.

Some or all of the components of the ARP 200 of FIG. 2 may be implemented as different integrated circuits. Different integrated circuits may be mounted on the same substrate, such as a printed circuit board (PCB). Alternatively, some or all of the components of the ARP 200 may be implemented as a single integrated circuit.

As should be apparent to a person skilled in the art, the ARP device 200 may capable of protecting more than one NVM device, and may be capable of providing the aforementioned functionality to each of the NVM devices that it protects. The ARP device 200 may store and use a hash value for each of the NVM device that it protects.

Figure 3:
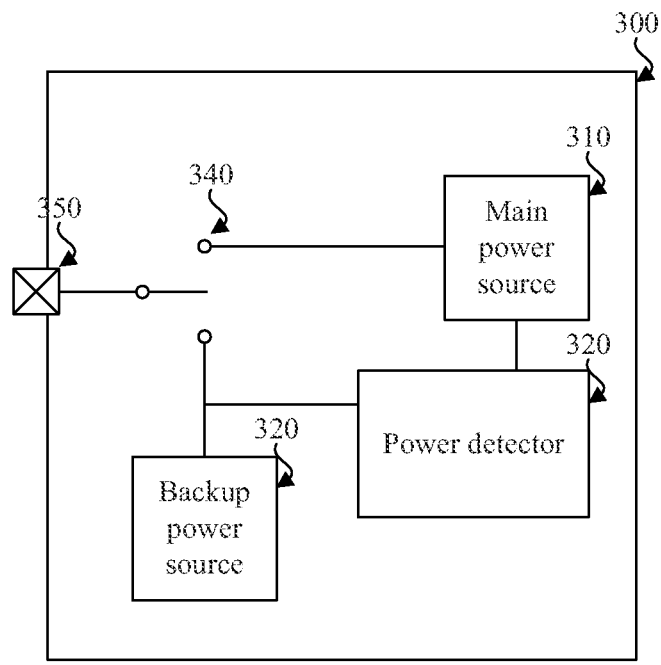
FIG. 3 illustrates an example power unit that may be used in the system of FIG. 1.

Turning to FIG. 3, an example power unit (PU) 300 is illustrated. The PU 300 includes a main power source 310, a power detector 320, a backup power source 330, a switch 340, and a power interface 350. As shown, the main power source 310 is coupled to the power detector 320 and the switch 340. Likewise, the backup power source 330 is coupled to the power detector 320 and the switch 340. The switch 340 is coupled to the power interface 350. The power units illustrated in FIGS. 1 and 2 may be implemented as described with respect the PU 300, but are not limited thereto.

The main power source 310 may be any type of energy source, such as a battery. Any battery known to a person skilled in the art, including (but not limited to) an alkaline battery, a lithium-ion battery, and the like are within the scope of this disclosure. The main power source 310 may or may not be rechargeable. The main power source 310 may supply energy inductively. The backup power source 330 may be any type of energy source that can supply power in the event that the main power source 310 fails. The backup power source 330 may be a battery, and may or may not be rechargeable. In the example embodiment illustrated in FIG. 3, the backup power source 330 is a reservoir capacitor that may be charged by the main power source 310 and store energy for use in the event that the main power source 310 fails.

The power detector 320 of FIG. 3 may detect the amount of power available in the main power source 310 and the backup power source 330. The power detector 320 may continuously monitor the amount of power available in the main power source 310 and the backup power source 330. The power detector 320 may also control the switch 340. When power is available in the main power source 310, the power detector 320 may set and maintain the switch 340 in a first position that connects the main power source 310 to the power interface 350. In response to the power detector 320 detecting that power is not available from the main power source 310 (e.g., a battery being removed from the PU 300), the power detector 320 may set the switch 340 in a second position that connects the backup power source 330 to the power interface 350. When the switch 340 is in the second position and the power detector 320 detects that power has become available from the main power source 310 (e.g., a new battery being installed in the PU 300), the power detector 320 may set the switch 340 to the first position.

The power detector 320 may also control the main power source 310 to provide power to the backup power source 330. For example, in response to detecting that the amount of power in the backup power source 330 is below a threshold level, the power detector 320 may charge the backup power source 330 using the main power source 310. The power detector 320 may be implemented in hardware, software, or any combination of hardware and software to achieve the functionality described above.

Figure 4:
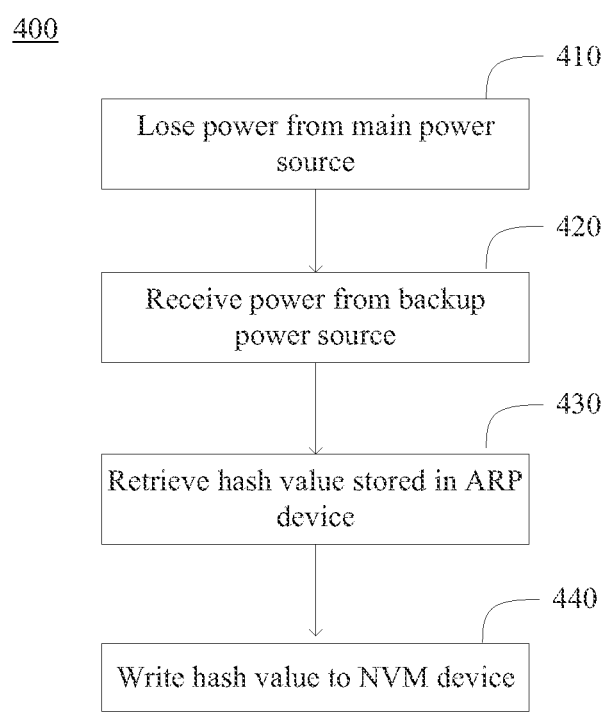
FIG. 4 illustrates an example method for replay protection of data stored in a non-volatile memory device in response to power loss in a device for providing anti-replay protection, such as the device of FIG. 2.

Turning now to FIG. 4, an example method 400 for replay protection of data stored in a non-volatile memory device in response to power loss in a device for providing anti-replay protection is illustrated. The example method 400 is described as being implemented by the ARP device 200 and PU 300 of FIGS. 2 and 3, respectively, but the method 400 is not limited thereto. Additionally, each stage of the method 400 may represent a computer-readable instruction stored on a non-transient computer-readable storage device, which, when executed by a processor causes the processor to perform one or more operations.

At stage 410, the ARP device 200 loses or fails to receive power from the main power source 310 of the PU 300. The ARP device 200 may detect the loss of power. For example, the controller 205 or the power-fail sequencer 230 may detect the loss of power. Additionally or alternatively, the PU 300 may indicate to the ARP device 200 that the main power source 310 has been depleted. For example, the power detector 320 may signal the ARP device 200 of the power failure. In one embodiment, the main power source 310 is a battery and a loss of power may result from the battery being removed from the PU 300 or becoming depleted.

At stage 420, the ARP device 200 receives power from the backup power source 330 of the PU 300. In one embodiment, the backup power source 330 is a reservoir capacitor that is capable of temporarily providing power to the ARP device 200.

Once backup power has been received at stage 420, the method 400 proceeds to stage 430 where the hash value stored in the ARP device 200 is retrieved. For example, the power-fail sequencer 230 of FIG. 2 may retrieve the hash value stored in the memory device 220. Next, at stage 440, the ARP device 200 writes the hash value retrieved in stage 430 to the NVM device that is coupled to the ARP device 200. For example, the power-fail sequencer 230 may instruct the NVM controller 210 to write the retrieved hash value to the NVM device. In response, the NVM controller 210 may write the hash value to the NVM device via interface 245.

Figure 5:
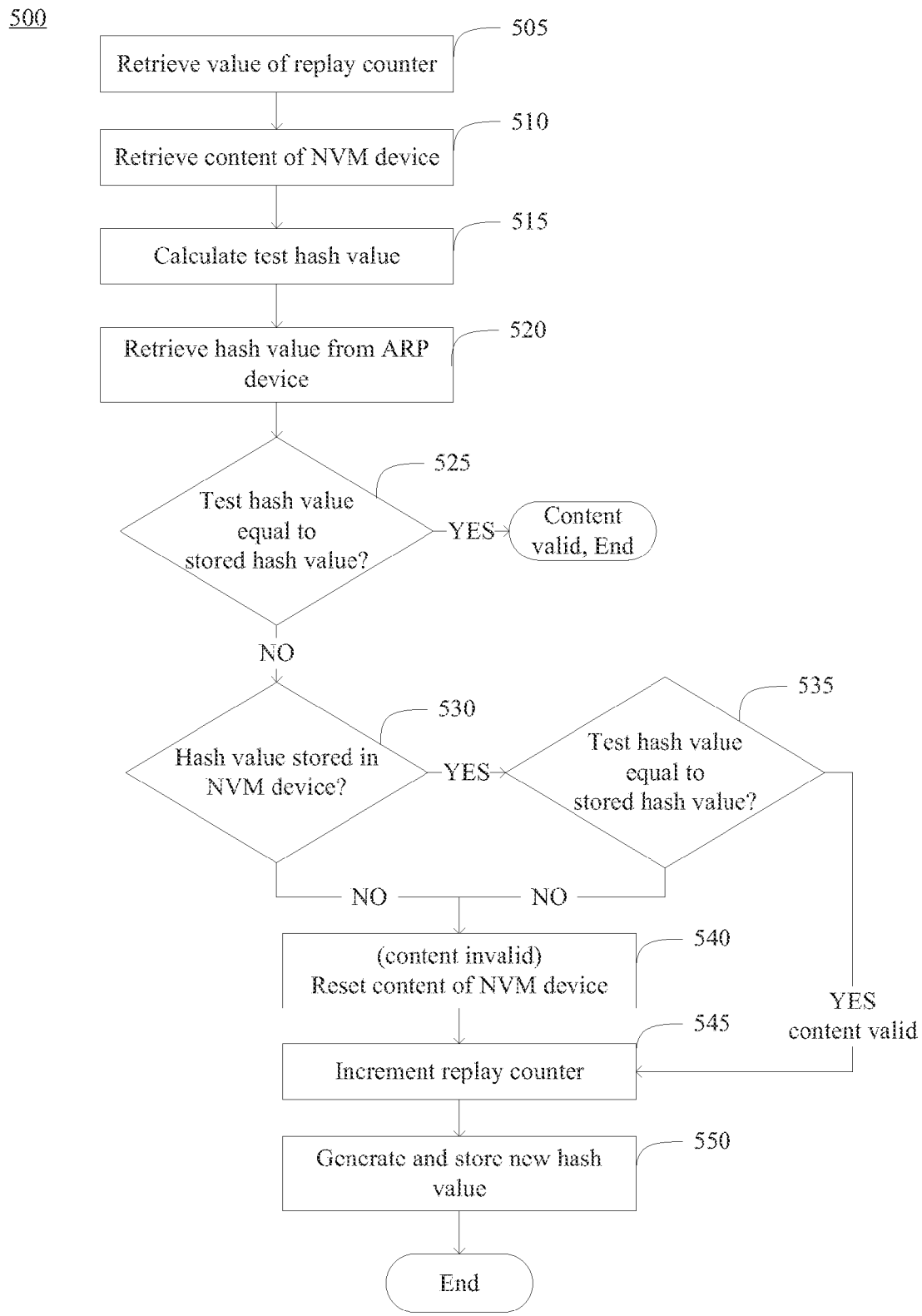
FIG. 5 illustrates an example method for booting or powering up a device for providing anti-reply protection of data stored in a non-volatile memory device, such as the device of FIG. 2.

Turning now to FIG. 5, an example method 500 method for booting or powering up a device for providing anti-replay protection of data stored in a non-volatile memory device is illustrated. The example method 500 is described as being implemented by the ARP device 200, but the method 500 is not limited thereto. Additionally, each stage of the method 500 may represent a computer-readable instruction stored on a non-transient computer-readable storage device, which, when executed by a processor causes the processor to perform one or more operations.

At stage 505, the value of the replay counter is retrieved. In the ARP device 200, the controller 205 may retrieve the value of the replay counter that is stored in the OTP memory device 215 via the bus 225. At stage 510, the content of the NVM device is retrieved. In the ARP device of 200, the controller 210 may instruct the NVM controller 210 (via the bus 225) to retrieve the content of the NVM device that is coupled to the ARP device 200. The NVM controller 210 may read the content of the NVM device via interface 240, and provide the content of the NVM device to the controller 210 via the bus 225.

At stage 515, a test hash value is generated using the value of the replay counter that was retrieved in stage 505 and the content of the NVM device that was retrieved in stage 510 as input. In the ARP device 200, the controller 205 may execute code to generate the test hash value. The controller 205 may, e.g., retrieve one or more cryptographic keys from the OTP memory 215 that may be used to generate the hash value (e.g., MAC).

The method 500 then proceeds to stage 520 where the hash value that is stored in the ARP device 200 is retrieved. The controller 205 may retrieve this hash value, which is stored in the memory device 200, via the bus 225. As mentioned above, this hash value may or may not be encrypted before being stored. Thus, when encrypted, this hash value may also be decrypted in stage 520. The controller 205 may retrieve and use a cryptographic key that is stored in the OTP memory device 215 to decrypt the hash value retrieved in stage 520.

Next, at stage 525, the test hash value is compared to the hash value that was stored in the ARP device 200 (which was retrieved and optionally decrypted in stage 520). This comparison may be performed by the controller 205. When the test hash value is equal to (matches) the hash value that was stored in the ARP device 200, the content of the NVM device is considered valid and the boot sequence ends. When the test hash value is not equal to (does not match) the hash value that was stored in the ARP device 200, the method 500 proceeds to stage 530.

At stage 530, the ARP device 200 searches for a hash value in the coupled NVM device. The controller 205 may instruct the NVM controller 210 to search the NVM device for a stored hash value. As described with respect to FIG. 4, the ARP device 200 may write a hash value stored in the ARP device 200 to the NVM device in response to a loss of power from a main power source (e.g., main power source 310 of PU 300). If the NVM device returns a hash value, the method 500 advances to stage 535, otherwise the method 500 advances to stage 540.

At stage 535, the hash value that was returned by the NVM device in stage 530 is compared to the test hash value that was generated in stage 515. The controller 205 may perform this comparison. If the hash values match, the content of the NVM device is considered valid and the method 500 proceeds to stage 545, otherwise the method 500 proceeds to stage 540.

Stage 540 is reached when either the NVM device fails to return a hash value at stage 530 or the test hash value does not match a hash value returned by the NVM device at stage 535. In either case, the content of the NVM device cannot be validated, and thus is reset to a factory or default setting. The default setting may be a backed-up copy of the contents of the NVM device at an earlier time. So, for example, the controller 205 may locate a backup copy of the contents of the NVM device and instruct the NVM controller 210 to write the copy to the NVM device at stage 540.

At stage 545, the replay counter is incremented. For example, the controller 205 may increment the reply counter stored in the OTP memory device 215. As stages 525-545 illustrate, losing or failing to receive power from a main power source is one example of an event that causes the replay counter of the ARP device 200 to be incremented. The inability to validate the content of the NVM device coupled to the ARP device 200 is another example of an event that causes the replay counter of the ARP device 200 to be incremented.

At stage 550, a new hash value is generated using the value of the incremented replay counter (stage 545) and the current content of the NVM device (which may have been reset if the content was unable to be validated by the ARP device 200). Again, the controller 205 may retrieve the value of the replay counter (via the OTP memory device 215) and the content of the NVM device (via the NVM controller 210) to generate the new hash value. The new hash value may be stored in the ARP device 200, e.g., in the memory device 220, and subsequently be used to validate the contents of the NVM device. After stage 550, the method 500 ends.

FIG. 6 illustrates an example computer system that may incorporate some or all of the components of the system 100 of FIG. 1. For example, the ARP device 120 and the PU 130 may be implemented in a handheld device that includes some or all of the components of the computer system 600 shown in FIG. 6. In this case, the handheld device may be used to protect an external NVM device, such as the NVM device 110 of FIG. 1, from replay attacks. Computer system 600 can be any well-known computer capable of performing the functions described herein, such as computers available from International Business Machines, Apple, Sun, HP, Dell, Sony, Toshiba, etc.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 600 also includes user input/output device(s) 603, such as monitors, keyboards, pointing devices, etc., which communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an example embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use example embodiments of the disclosure using data processing devices, computer systems and/or computer architectures other than that shown in FIG. 6. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all example embodiments of the present disclosure as contemplated by the inventors, and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described example embodiments, but should be defined only in accordance with the following claims and their equivalents.

What is claimed is:

1. A system for anti-replay protection comprising:
a non-volatile memory device;
a main power source; and
an anti-replay protection device configured to receive power from the main power source, the anti-replay protection device comprising:
a one-time programmable (OTP) memory device comprising a replay counter that is updated in response to at least a portion of the anti-replay protection device failing to receive power from the main power source;
a persistent memory device; and
a processor, coupled to the OTP memory device and to the persistent memory device, and configured to
generate a first hash value using the replay counter and data stored in the non-volatile memory device,
store the first hash value in the persistent memory device, and
compare the first hash value to a second hash value generated using the replay counter and data stored in the non-volatile memory device.

2. The system for anti-replay protection of claim 1, wherein the anti-replay protection device further comprises:
a memory controller configured to exchange data with the non-volatile memory device.

3. The system for anti-replay protection of claim 1, wherein the processor is further configured to increment the replay counter in response to the first and second hash values being different.

4. The system for anti-replay protection of claim 1, wherein the persistent memory device is battery-backed random access memory (RAM).

5. The system for anti-replay protection of claim 1, wherein the processor is further configured to encrypt the first hash value before storing the first hash value in the persistent memory device.

6. The system for anti-replay protection of claim 1, further comprising:
a backup power source configured to provide power to the anti-replay protection device in response to the anti-replay protection device losing power from the main power source,
wherein the anti-replay protection device is further configured to write a copy of the first hash value to the non-volatile memory device in response to receiving power from the backup power source.

7. The system for anti-replay protection of claim 6, further comprising:
a power detector configured to instruct the backup power source to provide power to the anti-replay protection device in response to detecting a loss of power from the main power source.

8. The system for anti-replay protection of claim 6, wherein:
the second hash value is generated in response to the anti-replay detection device regaining power from the main power source, and
the anti-replay protection device is further configured to attempt to retrieve the copy of the first hash value from the non-volatile memory device in response to the first hash value from the persistent memory device and the second hash value being different.

9. The system for anti-replay protection of claim 8, wherein the non-volatile memory device is erased and the replay counter is incremented in response to failing to retrieve the copy of the first hash value from the non-volatile memory device.

10. The system for anti-replay protection of claim 8, wherein:
the processor is further configured to compare the copy of the first hash value to the second hash value in response to retrieving the copy of the first hash value from the non-volatile memory device, and
the non-volatile memory device is erased in response to the copy of the first hash value and the second hash value being different.

11. An anti-replay protection device comprising:
a one-time programmable (OTP) memory device comprising a replay counter that is updated in response to at least a portion of the anti-replay protection device losing power from a main power source;
a persistent memory device; and
a processor, coupled to the OTP memory device and to the persistent memory device, and configured to
generate a first hash value using the replay counter,
store the first hash value in the persistent memory device, and
compare the first hash value to a second hash value generated using the replay counter.

12. The anti-replay protection device of claim 11, further comprising:
a memory controller configured to retrieve data stored in a non-volatile memory device that is external to the anti-replay protection device,
wherein the processor is further configured to generate the first and second hash values based on the replay counter and the data retrieved from the non-volatile memory device.

13. The anti-replay protection device of claim 12, further comprising:
a power-fail sequencer coupled to the memory controller and to the persistent memory device,
wherein the power-fail sequencer is configured to retrieve the first hash value from the persistent memory device and instruct the memory controller to write a copy of the first hash to the non-volatile memory device in response to at least a portion of the anti-replay protection device losing power from the main power source.

14. The anti-replay protection device of claim 13, wherein:
the processor is further configured to generate the second hash value in response to the anti-replay detection device regaining power from the main power source, and
the anti-replay protection device is further configured to attempt to retrieve the copy of the first hash value from the non-volatile memory device in response to the first hash value from the persistent memory device and the second hash value being different.

15. The anti-replay protection device of claim 14, wherein the anti-replay protection device instructs the non-volatile memory to erase the data stored in the non-volatile memory device and increments the replay counter in response to failing to retrieve the copy of the first hash value from the non-volatile memory device.

16. The anti-replay protection device of claim 14, wherein:
the processor is further configured to compare the copy of the first hash value to the second hash value in response to retrieving the copy of the first hash value from the non-volatile memory device, and
the anti-replay protection device instructs the non-volatile memory to erase the data stored in the non-volatile memory device in response to the copy of the first hash value and the second hash value being different.

17. The anti-replay protection device of claim 11, wherein the persistent memory device is battery-backed RAM.

18. The anti-replay protection device of claim 11, wherein the processor is further configured to increment the replay counter in response to the first and second hash values being different.

19. A method for anti-replay protection of data stored in a non-volatile memory device, the method comprising:
storing, in a one-time programmable (OTP) memory device, a replay counter that is incremented in response to failing to receive power from a main power source;
generating, by a processor, a first hash value using the replay counter and data stored in the non-volatile memory device;
storing, in a persistent memory device, the first hash value;
generating, by the processor, a second hash value using the reply counter and data stored in the non-volatile memory device; and
comparing, by the processor, the first hash value from the persistent memory device to the second hash value.

20. The method of claim 19, further comprising:
receiving power from a backup power source in response to failing to receive power from the main power source;
transmitting a copy of the first hash value to the non-volatile memory device,
wherein the generating the second hash value is in response to regaining power from the main power source.

21. The method of claim 20, further comprising:
attempting to retrieve the copy of the first hash value from the non-volatile memory device in response to the first hash value from the persistent memory device and the second hash value being different; and
erasing the non-volatile memory device and incrementing the replay counter in response to failing to retrieve the copy of the first hash value from the non-volatile memory device.

22. The method of claim 20, further comprising:
attempting to retrieve the copy of the first hash value from the non-volatile memory device in response to the first hash value from the persistent memory device and the second hash value being different;
comparing the copy of the first hash value to the second hash value in response to retrieving the copy of the first hash value from the non-volatile memory device;
erasing the non-volatile memory device in response to the copy of the first hash value and the second hash value being different or in response to failing to retrieve the copy of the first hash value; and
incrementing the replay counter.

* * * * *